(12) United States Patent
Azzam et al.

(10) Patent No.: US 6,201,181 B1
(45) Date of Patent: Mar. 13, 2001

(54) PORTABLE SOLAR MODULE CART

(75) Inventors: Moneer H. Azzam, Wellesley; Steven T. Slavsky, Natick; Brian A. Dalmaso, Leominster; Mark W. Wheeler, Groton, all of MA (US)

(73) Assignee: ASE Americas, Inc., Billerica, MA (US)

( * ) Notice: Subject to any disclaimer, the term of this patent is extended or adjusted under 35 U.S.C. 154(b) by 0 days.

(21) Appl. No.: 09/453,969

(22) Filed: Dec. 3, 1999

Related U.S. Application Data (60) Provisional application No. 60/111,394, filed on Dec. 8, 1998.

(51) Int. Cl.[7] ................ H01L 31/042; H01L 31/048; H01L 31/058
(52) U.S. Cl. ............ 136/244; 136/245; 136/246; 136/248; 136/291; 126/704; 126/600; 126/608; 126/627; 320/101; 280/63; 280/47.34
(58) Field of Search .................. 136/244, 245, 136/246, 248, 291; 126/600, 608, 627, 704; 320/101; 280/47.34, 63

(56) References Cited

U.S. PATENT DOCUMENTS

| 4,261,329 | * | 4/1981 | Walsh et al. | 126/569 |
| 4,421,943 | * | 12/1983 | Withjack | 136/245 |
| 4,512,334 | * | 4/1985 | Peachey | 126/618 |
| 5,039,930 | * | 8/1991 | Collier et al. | 320/105 |
| 5,969,501 | * | 10/1999 | Glidden et al. | 320/101 |

FOREIGN PATENT DOCUMENTS

| 2463566 | * | 3/1981 | (FR) . |
| 2591823 | * | 6/1987 | (FR) . |

* cited by examiner

*Primary Examiner*—Alan Diamond
(74) *Attorney, Agent, or Firm*—Pandiscio & Pandiscio (57) ABSTRACT

A portable solar module cart is provided which comprises a platform, a pair of wheels attached to opposite sides of the platform, a pair of support struts attached to opposite sides of the platform and movable relative to the platform between a first retracted position in which they lie substantially parallel to the platform and a second erected position in which they extend at a selected angle to the platform so that a DC power source can be disposed on and supported by the platform, a solar panel pivotally mounted to the struts, the solar panel being movable on its pivot when the struts are in their erected position so as to be in a perpendicular relationship with an imaginary line connecting the sun and the solar panel, whereby to maximize the solar energy collected by the panel, and means for locking the solar panel in any selected position on its pivot.

27 Claims, 7 Drawing Sheets

PORTABLE SOLAR MODULE CART

This application claims the benefit of U.S. Provisional Patent Application No. 60/111,394, filed Dec. 8, 1998.

This invention relates to use of photovoltaic solar panels and more particularly to providing a portable solar panel system that is capable of being rolled into position and is characterized by a cart arrangement that comprises a platform that serves as a solar panel/battery transporter and permits the panel to be oriented into a variety of angular positions.

INTRODUCTION

Photovoltaic panels, commonly called solar panels, generally comprise a plurality of interconnected modules each consisting of a plurality of interconnected photovoltaic cells. The solar panels are usually constructed much like a picture in a frame, with the solar cells being laminated between a transparent front cover and a protective back layer, and that laminate being mounted within a surrounding rectangular metal frame. Examples of solar modules and panels are provided by U.S. Pat. No. 4,097,308, issued Jun. 27, 1978 to W. R. Klein et al.; U.S. Pat. No. 4,433,200, issued Feb. 21, 1984 to T. L. Jester et al; U.S. Pat. No. 4,692,557, issued Sep. 8, 1987 to G. M. Samuelson et al.; U.S. Pat. No. 5,110,369 issued May 5, 1992 to E. Tornstrom et al.; U.S. Pat. No. 5,228,924, issued Jul. 20, 1993 to J. M. Barker et al; U.S. Pat. No. 5,478,402, issued Dec. 26, 1998 to J. I. Hanoka; and U.S. Pat. No. 5,733,382, issued Mar. 31, 1998 to J. I. Hanoka. The panels often include a diode assembly for protecting the solar cells from reverse bias damage, as shown by U.S. Pat. No. 4,323,719, issued Apr. 6, 1982 to M. A. Green, and U.S. Pat. No. 4,481,378, issued Nov. 6, 1984 to I. A. Lesk.

In many cases solar panels are used to charge batteries. One common solar system installation is one where a solar panel is used to charge one or more lead acid batteries similar to those used in automotive vehicles. These solar panels may be fixed to a roof, or a pole-type support, or some other type of support structure. Each lead acid battery typically weighs 50 to 100 lbs., and the typical solar panel used to charge such batteries provides 50 to 100 watts and weighs anywhere from 12 to 22 lbs. The metal frame of the solar panel is usually outfitted with a set of mounting holes to facilitate mounting the panel according to recommended mounting practices. The weight of these systems—particularly the battery—is one major reason why these systems are so often fixed, as compared to portable.

The concept disclosed here is to make these solar panel systems portable and readily deployable. The concept makes use of a solar panel's structural strength and shape. The components used to make the system portable are also used in positioning the solar panel for optimal orientation to the sun to maximize power production. The inventive concept comprises providing a platform for carrying the battery or other items. In preferred embodiments of the invention, the platform is hinged relative to the solar panel so that it can be nested against the solar panel when it is not needed to carry a battery or other items.

THE DRAWINGS

In the several drawings like elements are identified by like numerals.

DETAILED DESCRIPTION

Figure 1:
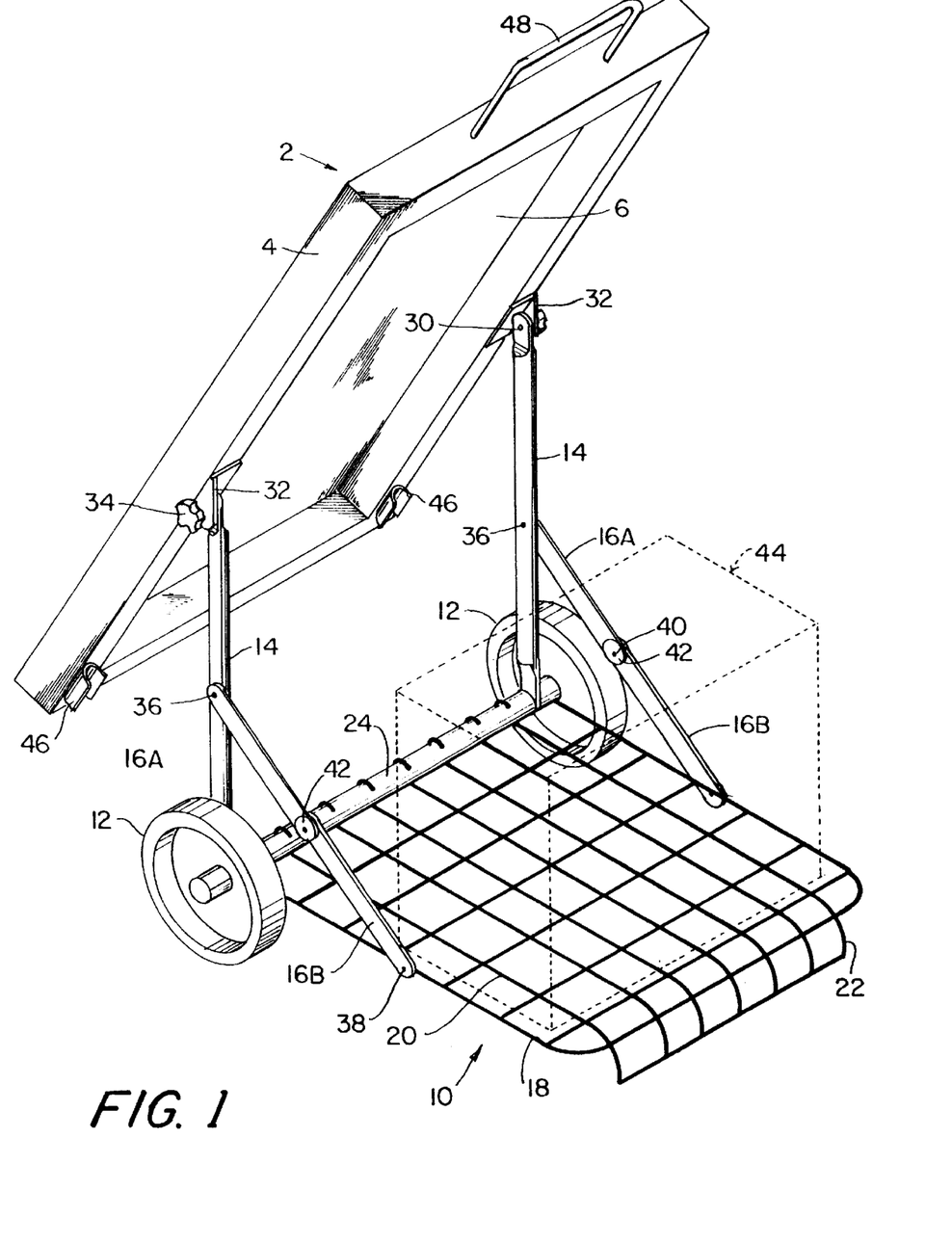
FIG. 1 is a perspective view of one embodiment of the invention in a charging mode arrangement.

FIG. 1 shows a portable solar module/cart system that comprises a rectangular solar panel 2 having a frame 4 that surrounds a flat array 6 of solar modules each comprising a plurality of photovoltaic cells that are aligned in a common plane within the frame. Details of the cells and modules are not shown since the construction of the cells and modules, and the mode of interconnecting cells and modules, form no part of and are not critical to the invention. More specifically, various forms of photovoltaic solar panels known to persons skilled in the art may be used in practicing this invention, including but not limited to the panels disclosed by the U.S. patents listed hereinabove.

The solar panel 2 is mounted on a form of cart that comprises a platform identified generally at 10, a pair of wheels 12, a pair of solar panel support struts 14, and a pair of articulated link assemblies each comprising two pivotally connected links 16A and 16B. Preferably, but not necessarily, the platform 10 comprises a metal frame 18 to which is welded a metal wire grill 20. The wire grill extends over and below the rear end of the platform so as to form a depending end section or skirt 22 that functions as a supporting leg to hold the platform substantially horizontal when it is resting on a floor. The front end of the platform frame comprises a hollow shaft 24 that functions as an axle for the two wheels 12 which are rotatably mounted on the ends of the shaft. The wheels are mounted so that they cannot move axially on shaft 24.

Figure 2:
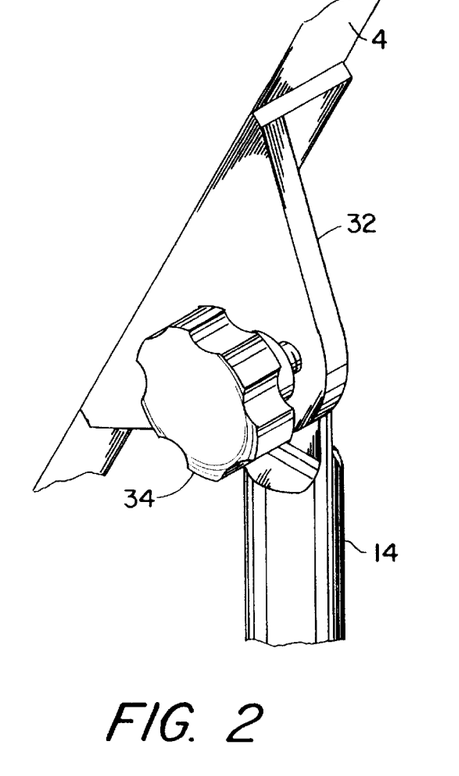
FIGS. 2–4 are enlarged fragmentary perspective views of details of features forming part of the embodiment shown in FIG. 1.
Figure 3:
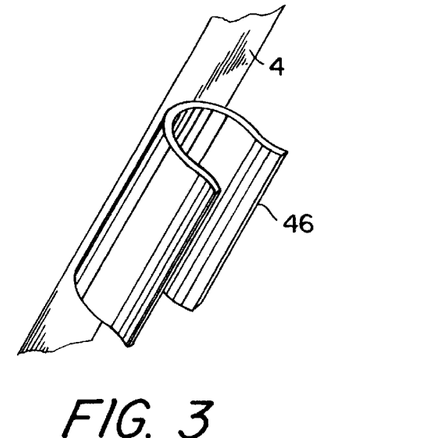
Figure 4:
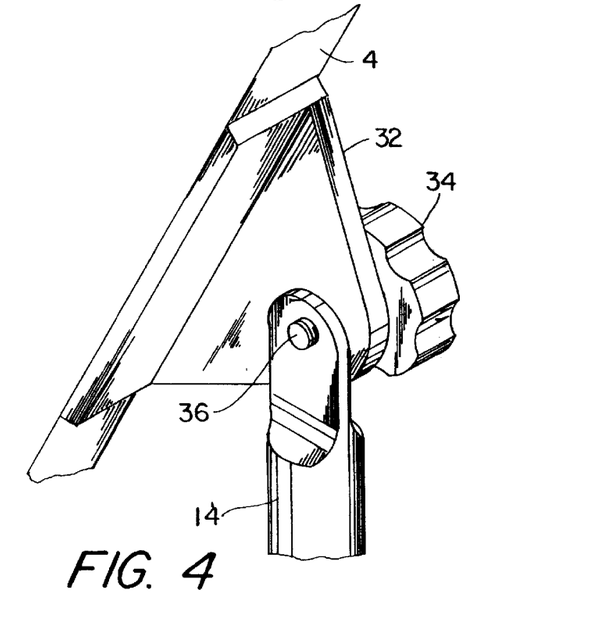

The two support struts 14 are rotatably attached to shaft 24 between wheels 12 and the adjacent portions of the front end of the platform. By way of example, the struts 14 may be hollow metal tubes having their bottom ends flattened and provided with holes sized to accommodate shaft 24. Regardless of how they are coupled to shaft 24, the struts 14 can pivot on that shaft. The struts are disposed on shaft 24 so as not to interfere with the ability of the wheels to rotate freely on that shaft. The upper ends of the struts 14 are also flattened, and affixed thereto are threaded pivot pins 30 that extend through holes in brackets 32 that are welded to the rear side surfaces of the solar panel frame 4, as shown in FIGS. 1, 2 and 4. Thumb wheel-type nuts 34 are screwed onto the pivot pins 30 into frictional engagement with brackets 32, so as to lock the panel in a selected angular position relative to struts 14. Lock washers (not shown) are positioned on pins 30 between nuts 34 and brackets 32 to prevent those nuts from becoming loose. Although not shown, it is preferred that the mutually engaging faces of struts 14 and brackets 32 be roughened, or provided with mutually engageable teeth, so as to improve the gripping action of the struts to the brackets and thereby assure that the panel will remain locked in a selected angular position until the nuts 34 are deliberately loosened.

The links 16A are pivotally connected to struts 14 and links 16B are pivotally connected to platform frame 18 by pivot pins 36 and 38 respectively. Preferably means are provided for locking the links 16A and 16B in their extended position (shown in FIG. 1), so that the platform acts as a stabilizing support for the panel. By way of example, the center pivot pins 40 may be threaded and provided with wheel nuts as represented schematically at 42 for locking the links in their extended position. Other mechanical means also may be used for locking the links in their extended position.

Attached to the rear side of the solar panel frame 4 are two C-shaped spring retaining clips 46 made of metal or other suitable material. Clips 46 are sized to slip over and grip struts 14, as hereinafter explained.

The foregoing construction is designed to facilitate transporting the solar panel 2, with or without a suitable rechargeable DC power source (e.g. a lead acid battery) shown in phantom at 44 in FIG. 1, to a selected site. To facilitate such transportation, a handle 48 is secured to one end section of the panel frame 4. Alternatively, the same or a different form of handle may be affixed to the opposite end section of frame 4 or to the opposite side sections of solar panel frame 4.

The cart shown in FIGS. 1–4 is arranged for three different modes of use: a storage mode arrangement, a charging mode arrangement, and a rolling mode arrangement. In FIG. 1 the cart is shown in its charging mode arrangement, with the solar panel 2 inclined so as to extend in a perpendicular relationship with an imaginary line connecting the sun and the solar panel, whereby to maximize the solar energy collected by the panel. When the cart is in its charging mode configuration, it is connected to a suitable rechargeable DC power source such as a lead acid battery mounted on the platform 10 or to a like rechargeable DC power source that is not disposed on the platform.

The storage mode of the cart involves folding the cart into a substantially flat arrangement by virtue of the hinging action resulting from the fact that the struts 14 can pivot on shaft 24. Folding the cart to a collapsed state for storage involves (1) loosening the wheel nuts 42 to allow links 16A to pivot outwardly relative to links 16B, whereby the struts 14 can be moved down toward the platform 10, and (2) also loosening the thumb wheel nuts 34, so that the solar panel can be pivoted into substantially parallel relation with struts 14 and platform 10 so that clips 46 embrace and lock to struts 14. Once this collapsing action has been accomplished, the nuts 42 can be tightened so as to keep the platform in its collapsed state adjacent solar panel 2. When the cart, including the solar panel, is in this collapsed condition, it occupies less space, which is advantageous for storage and shipping purposes.

The arrangement for the rolling mode is similar to that for the charging mode, except that the solar panel is set so that it lies parallel to the struts 14 and so that its clips 46 embrace and grip the two struts. Changing from the charging mode arrangement to the rolling mode arrangement is easily accomplished, requiring merely that the thumb wheel nuts 34 be loosened sufficiently to allow the solar panel to be pivoted (counterclockwise as viewed in FIG. 1) from the inclined charging position of FIG. 1 to a vertical position in which clips 46 are engaged with struts 14. Then the nuts 34 are re-tightened so as to keep the solar panel's clips 46 engaged with struts 14. Thereafter, by means of handle 48, the operator can tilt the cart so that skirt 22 is raised off of the ground or floor, and then, still using the handle, the operator can propel and maneuver the cart much like moving a wheelbarrow or two wheel hand truck or dolly.

The rolling mode arrangement of the cart facilitates moving the solar panel, with or without its rechargeable power source 44, to a selected site by virtue of the rolling action of wheels 12, with the handle 48 being used to maneuver and move the solar cell. It is contemplated that the cart may be moved to the selected site without serving as a transporter for a rechargeable DC power source, with the latter being provided at the site. However, a more likely scenario involves placing the rechargeable power source on the platform and using the cart to transport the power source to the selected site at which the solar panel is to be used to collect solar energy and convert it to electricity for use in charging that power source.

It is to be understood that when the solar panel system is in place at a selected site, it may be kept attached to struts 14, or it may be detached therefrom and mounted to another supporting structure. In either case, when the panel is in use, i.e., in the charging mode, a rechargeable DC power source 44 is coupled to the photovoltaic solar panel for charging by the DC electric power generated by that panel in response to impinging solar radiation.

It should be noted that the platform 10 may be used to carry other items in place of or in addition to the DC power source. By way of example, but not limitation, the platform could be used to transport and support such diverse devices as an electric pump, an electric water distiller, a small refrigerator, a lighting unit, or a tool kit.

Figure 5:
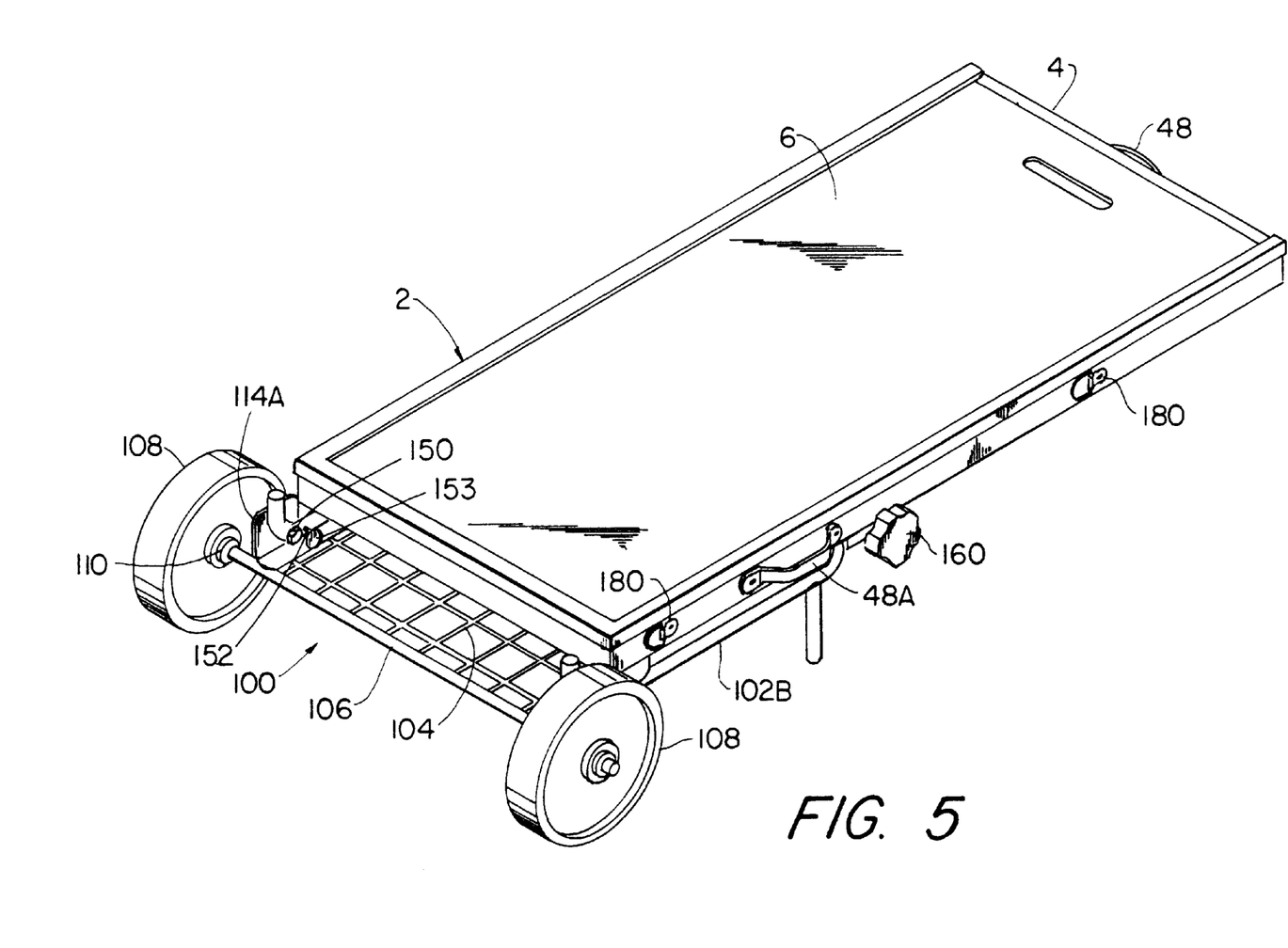
FIG. 5 is a perspective view illustrating a second and preferred embodiment of the invention in a storage mode arrangement.
Figure 6:
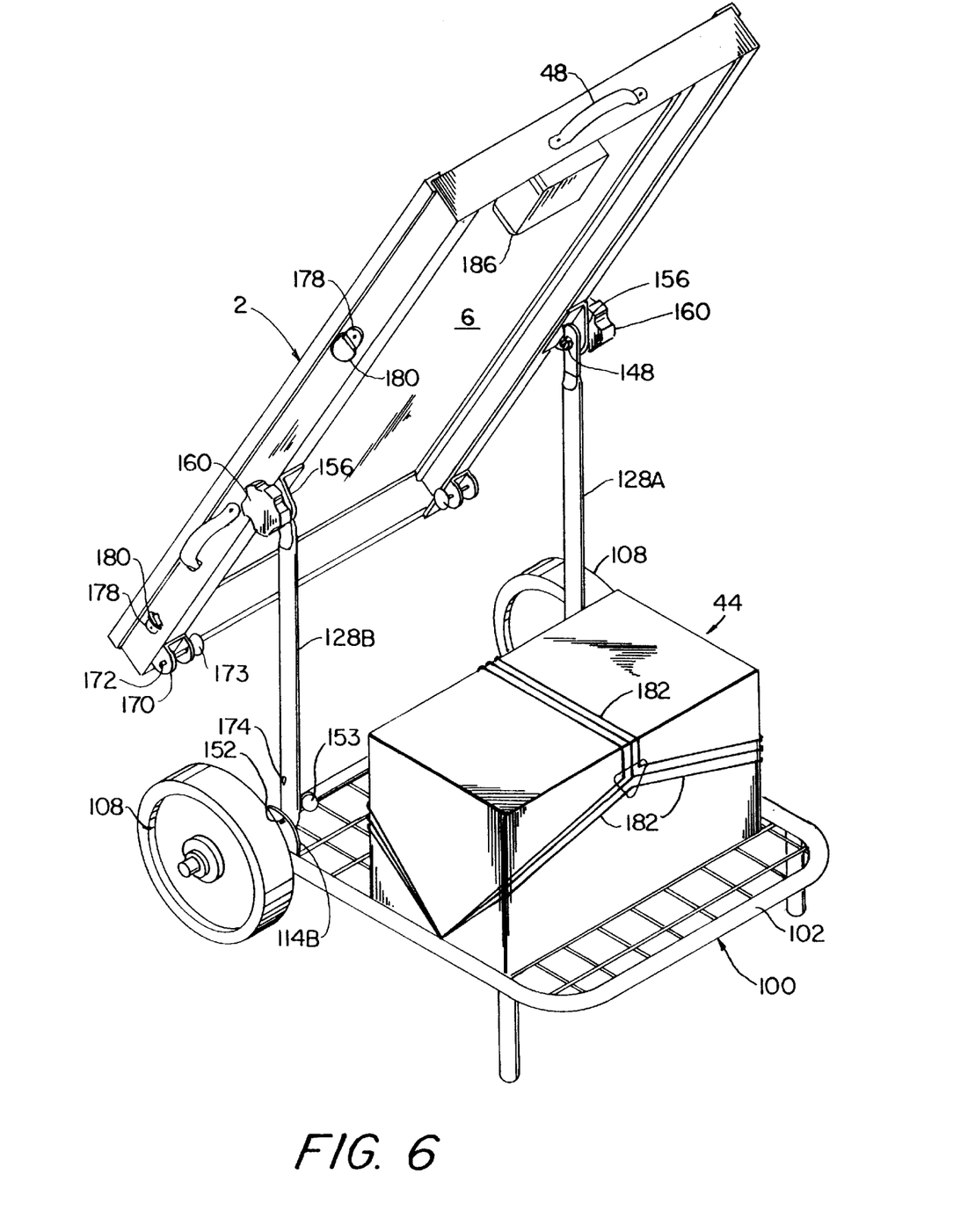
FIG. 6 is a perspective view of the second embodiment in a charging mode arrangement.
Figure 7:
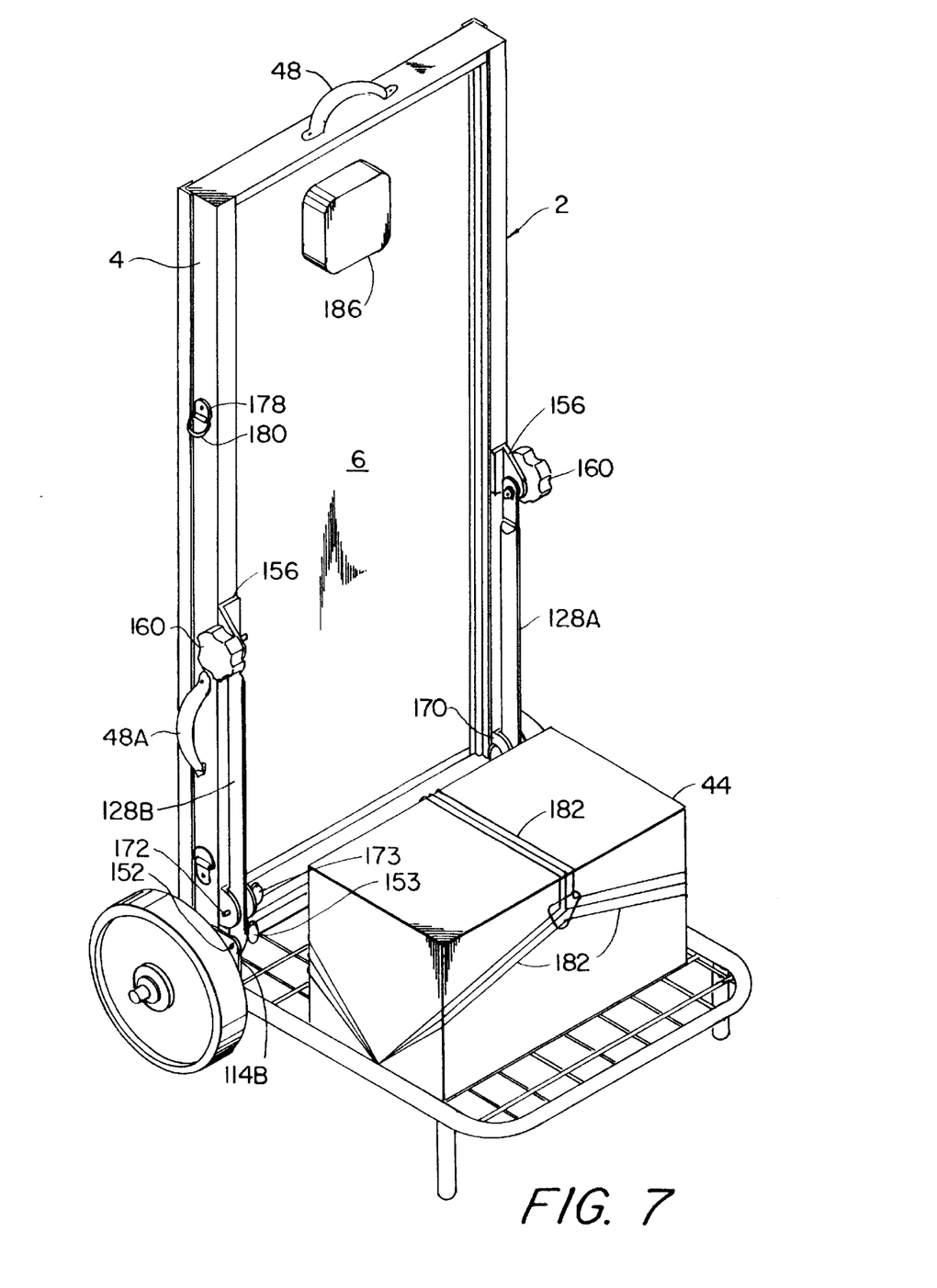
FIG. 7 is a perspective view of the second embodiment in a rolling mode arrangement.
Figure 8:
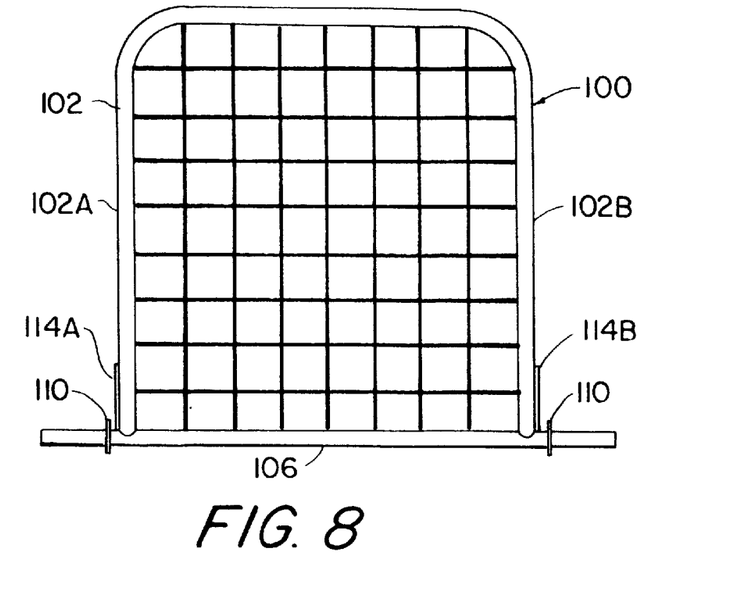
FIG. 8 is a plan view of the platform of the second embodiment.
Figure 9:
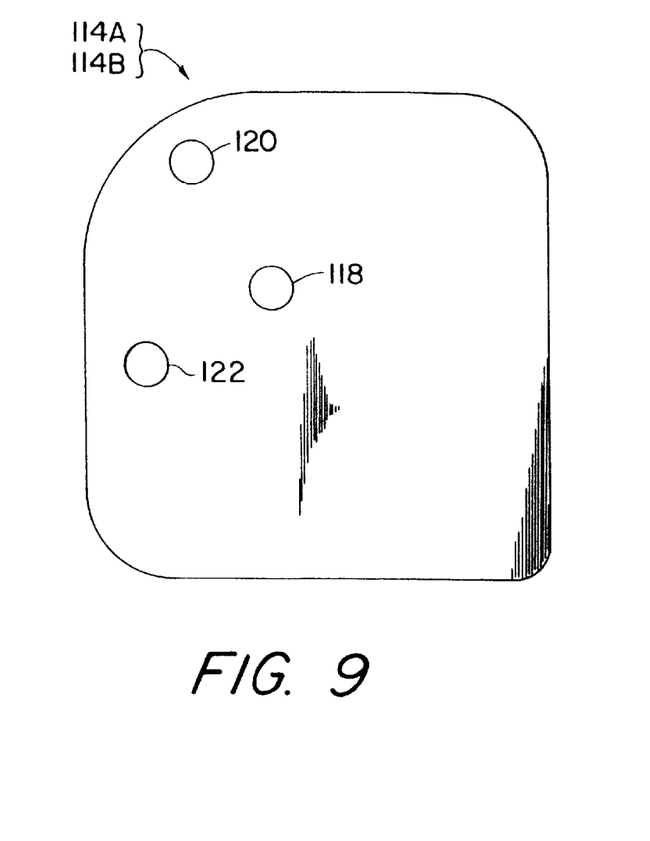
FIG. 9 is a side view of one of the bracket plates of the second embodiment.
Figure 10:
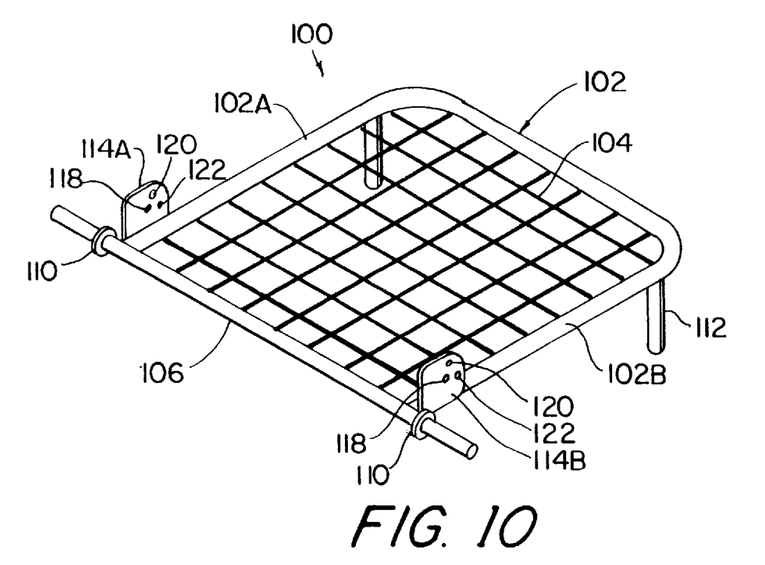
FIG. 10 is a perspective view illustrating a pair of bracket plates attached to the platform of the second embodiment.

Turning now to FIGS. 5–7, there is illustrated a preferred form of solar panel/rechargeable DC power source transporter in the form of a cart that comprises a platform identified generally at 100 that comprises a rectangularly-shaped tubular metal frame 102 to which is welded a metal wire grill 104. The front end of frame 102 consists of a cylindrical rod or tube 106 that protrudes beyond the sides of the platform and serves as an axle for a pair of wheels 108 that are rotatably mounted on the opposite ends of tube 106 and retained there by suitable means, e.g., by nuts (now shown) that are screwed onto threaded ends of axle 106. Mounted on and affixed to tube 106, e.g., by welding, are two metal disks 110 that serve as spacers to keep wheels 108 from rubbing against the sides of the platform. Affixed to the rear end of frame 102 are two like depending legs or standoffs 112 that serve to support the rear end of the platform. The lengths of legs 112 are sized so that the plane of the platform is horizontal when the wheels and legs are resting on a level floor.

As seen in FIGS. 6–10, two like plates 114A and 114B are attached to the two side sections 102A and 102B of platform frame 102 adjacent the front end of the platform. Plates 114A, 14B are affixed to tubular sections 102A and 102B by suitable means, e.g. by welding, brazing or a bonding agent such as an epoxy resin. Each of the plates 114A, 114B is provided with three holes 118, 120 and 122 arranged in a triangular pattern. The plates are oriented relative to platform 100 so that hole 118 is forward and hole 122 is rearward as shown.

Figure 11:
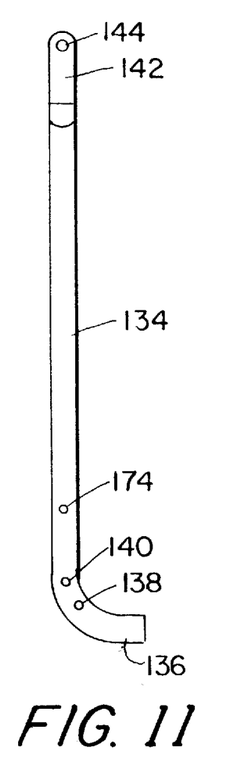
FIG. 11 is a side elevation of one of the struts of the second embodiment.
Figure 12:
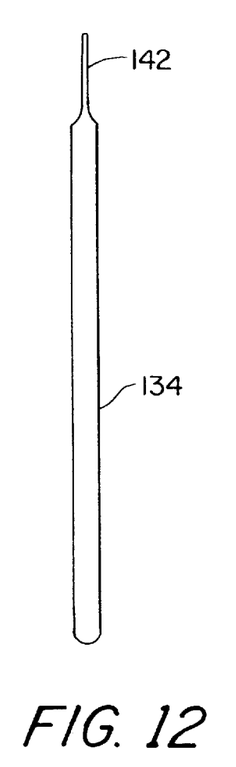
FIG. 12 is a front view in elevation of the strut shown in FIG. 11.
Figure 13:
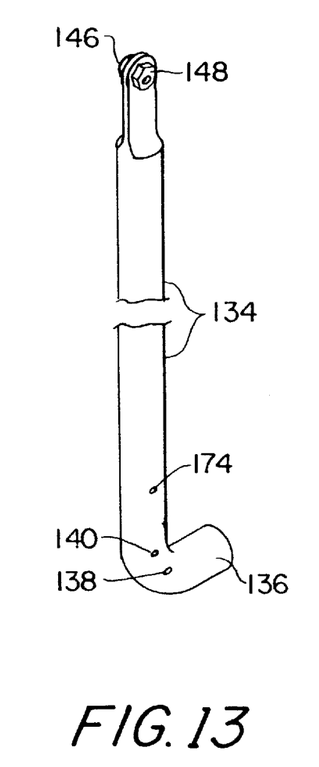
FIG. 13 is a perspective view of a strut assembly that includes the strut shown in FIGS. 11 and 12.

Plates 114A and 114B serve as pivot anchors for a pair of like struts 128A and 128B respectively. FIGS. 11–13 illustrate details of the struts. As shown those drawings, each strut is J-shaped, comprising a tube or rod 134 of cylindrical cross-section which is bent at one end so as to provide a short section 136 that extends at approximately a right angle to remainder of the strut. The transition from the main portion of the strut to the short section 136 preferably is curved (preferably it has a generally circular curvature as best shown in FIG. 11), and that transition portion is provided with a pair of holes 138 and 140 which are approximately the same size as the holes 118, 120 and 122. The opposite end of the strut is flattened laterally as shown at 142 and that flat portion is provided with a pivot hole 144. Referring now to FIG. 13, affixed to opposite sides of flat portion 142 are a washer 146 and a nut 148. The center holes of washer 146 and nut 148 are aligned with pivot hole 144. Struts 128A and 128B are identical, except that on strut 128B the washer 146 and nut 148 are reversed from the position occupied by those components on strut 128A.

The struts 128A and 128B are disposed between and attached to plates 114A, 114B respectively by pivot pins 150 (FIG. 5) which are sized to make a close fit in holes 120 and holes 138. Struts 128A and 128B are oriented so that their nuts 148 confront one another (FIG. 6) and their washers 146 face outwardly. A removable bayonet-type lock pin 152 with a ring handle 153 (FIGS. 5–7) also is provided for each strut for the purpose of locking the strut in a raised position (FIGS. 6 & 7) or in a lowered position (FIG. 5), as explained hereinafter. The struts 128A and 128B are mounted to plates 114A and 114B respectively so that their bent sections 136 face forward (i.e., away from the rear end of the platform as viewed in FIGS. 5–7) and rest on top of the axle 106 when the struts are in the raised position of FIGS. 6 and 7. This engagement of the bent sections 136 with axle 106 limits the extent to which the struts can pivot forward, and effectively stops the struts in a vertical position, i.e., at an angle of about 90° with respect to the platform. When the struts are in this raised position (FIGS. 6 & 7), lock pins 152 are inserted in plate holes 120 and strut holes 140 so as to prevent rearward pivotal movement of the struts, i.e., to prevent them from moving from raised to lowered position. When it is desired to collapse the unit for storage or shipment a shown in FIG. 5, pins 152 are removed from plate holes 120 and strut holes 140, thereby freeing the struts for pivotal movement down toward the platform. When the struts are lying flat against the platform, lock pins 152 are inserted in plate holes 122 and strut holes 140, thereby locking the struts in their down or stored position.

Turning again to FIGS. 5–7, the struts 128A and 128B support a solar panel 2 of the form described in connection with FIGS. 14. The frame 4 is provided with two like L-shaped brackets 156 (FIGS. 6 & 7) that are affixed to the frame by suitable means, e.g., by welding or screws. Each bracket 156 has a hole sized to accept a thumb screw 160 that extends through washer 146 and pivot hole 144 and is screwed into the nut 148 of the associated strut. Preferably also solar panel 2 is provided with side handles at one or both of its opposite sides, as illustrated at 48A in FIGS. 5 and 7, for use in maneuvering the panel and cart and carrying the panel when it is free of struts 128A, 128B.

Referring specifically to FIGS. 6 & 7, the opposite side sections of frame 4 of solar panel 2 are provided with a pair of U-shaped clamps 170 (only one is shown in FIG. 6), with each clamp including a bayonet-type lock pin 172 having a ring handle 173 and a pair of holes in opposite sides of each clamp for receiving lock pin 172. The two clamps 170 are sized to embrace struts 128A, 128B when the panel is pivoted into parallel relation with struts 128A, 128B, and lock pins 172 are also sized to fit into through holes 174 formed in struts 128A and 128B. Pins 172 are insertable into holes 174 of struts 128A, 128B so as to lock the panel against pivotal movement relative to the struts when the panel and cart are in the rolling mode arrangement (FIG. 7).

As noted previously in connection with the embodiment of FIG. 1, the panel 2 may be detached from the cart shown in FIGS. 5–7 and mounted on a separate supporting structure at a selected use site. In anticipation of such separation of the solar panel from the cart, a pair of clips 178 may be mounted to at least one side of the panel (FIGS. 5–7), with each clip having a hinged ring member 180 for receiving a shoulder strap (not shown) which may be used for carrying the panel away from the cart to another fixed or movable supporting structure (not shown).

FIGS. 6 and 7 schematically illustrate a rechargeable DC power source package 44 mounted on platform 100. Preferably, but not necessarily, suitable tie-down straps 182 may be used secure the rechargeable power supply to the platform. The rechargeable DC power source 44 used with the cart preferably includes, in addition to a rechargeable battery, an inverter (not shown) for converting DC to AC current, and an AC-to-DC charger (also no shown) for charging the battery from an external AC power source when the solar panel is not being used to capture solar energy. Both the inverter and the AC-to-DC charger are connected to the battery, with the inverter provided with a connector for connecting it to an external circuit device, e.g., to a conventional electrical wall outlet. Similarly the AC-to-DC charger is provided with a connector for connecting it to an external AC power source, e.g., to a conventional 110 volt source. In this connection it should be noted that it is common to couple the panel to the battery via or together with a protective diode circuit device, and typically such protective device is mounted on the rear side of the panel as illustrated at 186. However, it may be made part of the rechargeable DC power source package. For convenience of illustration, the drawings do not show the cables that are used to connect the battery with the solar panel, protective diode circuit device, the inverter and the battery charger.

Essentially the invention described above essentially comprises a photovoltaic solar panel and a wheeled platform which are combined so as to form a cart for use in moving the solar panel to a selected site and also for use in transporting a rechargeable DC power source and/or other equipment with the solar panel.

Obviously the invention may be implemented other than as specifically described or illustrated. Thus, for example, the platform 20 may be arranged so that it nests within the framework 4 when it is swung to its closed position relative to the solar panel. Also some other form of locking means may be used in place of clips 46. Similarly, the links 16A, 16B of the embodiment of FIG. 1 can be connected to one another by means of commercially available locking hinges. It is contemplated also that some other connecting means may be used for attaching the solar panel to the struts 14 or 128, 130. Another possible modification is to pivotally attach one end of the solar panel to the axle shaft 24, and use two linkages, similar to linkages 16A, 16B, connected between the platform and the sides of the frame 4, to facilitate movement of the solar panel from a first position in which the platform is nested within its frame 4 and a second position in which the solar panel is disposed at an acute angle to the platform in an optimum position to receive solar radiation. The platforms shown in the drawings also may be modified by replacing the grills 20 and 104 with a solid sheet of metal or other suitable material, e.g., glass fiber reinforced plastics. A further possible modification is to provide releasable locking means (e.g., spring pins, locking slides, etc.) for locking the struts 14 against pivotal movement relative to shaft 24, thereby allowing the struts to be pivoted on shaft 24 between a first collapsed position adjacent to platform 10 and a second expanded or open position similar to that illustrated in FIG. 1, with the locking means releasably locking the struts in that second position. In such a modification the links 16A, 16B may be retained or omitted, as desired. Still other modifications to the two embodiments shown in FIGS. 1 and 5 will be obvious to persons skilled in the art.

What is claimed is:

1. A portable solar module cart comprising:
   a substantially flat platform having first and second opposite ends,
   a pair of wheels attached to opposite sides of said platform at said first end;
   a pair of support struts pivotally attached to opposite sides of said platform at said first end, said struts being pivotable between a first stored position adjacent said platform and a second raised position in which they extend at an angle to said platform;
   a solar panel disposed between said struts said panel having opposite ends; and
   means pivotally connecting said solar panel to said struts so that said solar panel is pivotable on an axis located between said opposite ends between a first pivot position in which it extends substantially parallel to said struts and a second pivot position in which it extends at an angle to said struts.

2. A cart according to claim 1 further including means connecting said struts and said panel for releasably locking said panel in a selected angular position relative to said struts.

3. A cart according to claim 2 further including releasable lock means for releasably locking said struts in said second raised position.

4. A cart according to claim 3 wherein said releasable lock means comprises a pair of pins that are engagable with said struts and said platform.

5. A cart according to claim 1 further including releasable lock means for selectively and releasably locking said struts in said first stored position or said second raised position.

6. A cart according to claim 5 wherein said releasable lock means for selectively and releasably locking said struts in said first or second positions comprises a pair of pins that are engagable with said struts and said platform.

7. A cart according to claim 2 wherein said means for releasably locking said panel in a selected annular position relative to said struts comprises a pair of thumb screws interconnecting said struts and said panel.

8. A portable solar module apparatus according to claim 1 wherein said panel has opposite sides that extend at a right angle to its said opposite ends, and further including handle means on one of said opposite ends of said panel for use in propelling said apparatus.

9. A cart according to claim 1 further including an articulated link assembly comprising first and second links each having first and second ends, said first link having its said first end pivotally attached to said platform and its said second end pivotally attached to said second end of said second link, and said second link having its said first end pivotally attached to said panel, and means for locking said links against pivotal movement relative to each other so as to maintain said struts in said raised position.

10. A cart according to claim 9 wherein said panel has opposite sides that extend parallel to said opposite sides of said platform, and said articulated link assembly is pivotally attached to one side of said platform and a corresponding side of said panel, and further including a second like articulated link assembly pivotally attached to the other side of said platform and the corresponding side of said panel.

11. A cart according to claim 10 wherein said second ends of said first and second links are pivotally connected by pivot means having the capability of releasably locking said links against pivotal movement relative to one another.

12. A pivotable solar module cart according to claim 1 wherein said panel has opposite sides that extend at a right angle to its opposite ends, and said means pivotally connecting said panel to said struts comprise brackets attached to said opposite sides of said panel.

13. A portable solar module cart for use as a transporter for a rechargeable DC power source comprising:
   a substantially flat platform adapted to support a rechargeable DC power source,
   a pair of wheels attached to opposite sides of said platform;
   a pair of support struts pivotally attached to said platform at said opposite sides thereof, said struts being pivotable relative to said platform between a first stored position adjacent said platform and a second raised position in which they extend at an angle to said platform;
   means for releasably locking said struts in said second raised position relative to said platform;
   a generally flat solar panel disposed between said struts;
   means pivotally connecting said solar panel to said struts so that said panel is supported by said struts and has a pivot axis located between opposite ends thereof; and
   means for releasably locking said panel against pivotal movement relative to said struts.

14. A cart according to claim 13 further including at least one handle attached to one end of said solar panel for use in maneuvering said cart.

15. A cart according to claim 13 wherein said means for releasably locking said struts in said second raised position comprises a pair of pins that are engagable with said struts and said platform.

16. A cart according to claim 13 wherein said means for releasably locking said struts in said second raised position is also adapted to selectively and releasably lock said struts in said first stored position.

17. A cart according to claim 13 wherein said means for releasably locking said panel against pivotal movement relative to said struts comprises a pair of thumb screws.

18. A cart according to claim 13 wherein said support struts are detachably connected to said platform.

19. A cart according to claim 13 wherein each of said support struts has a bent end section, and said platform has a front end and a rear end and an axle at its said front end, and further wherein said bent end section of each of said struts engages said axle when said struts are in said second raised position.

20. A manually maneuverable two-wheel cart comprising:
   a substantially flat platform with two mutually spaced wheels at one end thereof, said wheels having a common axis of rotation;
   a pair of mutually spaced struts having first and second opposite ends, with said first ends being pivotally connected to said platform at said one end thereof, said struts being pivotable into and out of parallel or near parallel relationship with the plane of said platform;

a solar panel disposed between said struts, said panel having first and second opposite ends and first and second opposite sides, means at said opposite sides of said panel for pivotally connecting said panel to said struts adjacent said second ends of said struts, with the pivot axis of said panel being located between its said opposite ends; and releasable lock means for locking said panel to said struts so as to prevent said panel from pivoting relative to said struts.

21. A portable solar module cart comprising:

a platform having first and second opposite ends, a pair of wheels attached to opposite sides of said platform at said first end;

a pair of support struts pivotally attached to opposite sides of said platform at said first end;

a solar panel extending between said struts, said solar panel having opposite ends and opposite sides extending between said opposite ends; and means at the opposite sides of said solar panel pivotally connecting said solar panel to said struts so that said panel has a pivot axis located between its opposite ends;

said struts and said panel being movable from one to the other of a first storage mode position in which said struts and said panel extend substantially parallel to said platform, a charging mode position in which said struts are in a raised position wherein they extend at an angle to said platform and said panel extends at an angle to said platform and said struts, and a rolling mode position in which said struts are in said raised position and said panel extends substantially parallel to said struts.

22. A portable cart according to claim 21 wherein a rechargeable battery is supported on said platform when said cart is in said rolling mode position.

23. A portable cart according to claim 21 further including lock means for locking said panel against pivotal movement relative to said struts when said cart is in said rolling mode position.

24. A portable cart according to claim 23 further including additional lock means for releasably locking said struts against pivotal movement relative to said platform when said cart is in said rolling mode position.

25. A portable cart according to claim 24 wherein said additional lock means is adapted to releasably lock said struts against pivotal movement relative to said platform when said cart is in said charging mode position.

26. A portable cart according to claim 21 further including releasable means for locking said panel against pivotal movement relative to said struts when said cart is in said charging mode position.

27. A portable cart according to claim 20 wherein said solar panel has a rectangular frame, and said platform is surrounded by said frame when said cart is in said storage mode position.

* * * * *

UNITED STATES PATENT AND TRADEMARK OFFICE
CERTIFICATE OF CORRECTION

PATENT NO. : 6,201,181B1
DATED : March 13, 2001
INVENTOR(S) : Moneer H. Azzam et al It is certified that error appears in the above-identified patent and that said Letters Patent is hereby corrected as shown below:

Column 7,
Line 26, add a comma after the word "struts".

Signed and Sealed this

Twenty-first Day of August, 2001

*Attest:*

*Nicholas P. Godici*

*Attesting Officer*

NICHOLAS P. GODICI
*Acting Director of the United States Patent and Trademark Office*